US012793030B1

(12) United States Patent
Meyer et al.

(10) Patent No.: US 12,793,030 B1
(45) Date of Patent: Nov. 10, 2026

(54) ATMS FOR TRANSACTING WITH MOBILE APPLICATIONS

(71) Applicant: UIPCO, LLC, San Antonio, TX (US)

(72) Inventors: Gregory Brian Meyer, San Antonio, TX (US); Ivan Ortiz, Little Elm, TX (US); Joel S. Hartshorn, Port Orchard, WA (US); Janell Guzman, Boerne, TX (US); Yevgeniy Viatcheslavovich Khmelev, San Antonio, TX (US); Seth E. Ethington, McKinney, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 175 days.

(21) Appl. No.: 18/192,977

(22) Filed: Mar. 30, 2023

Related U.S. Application Data

(60) Provisional application No. 63/325,767, filed on Mar. 31, 2022.

(51) Int. Cl.
*G06Q 20/10* (2012.01)
*G06Q 20/32* (2012.01)
*G06Q 20/40* (2012.01)

(52) U.S. Cl.
CPC ..... *G06Q 20/1085* (2013.01); *G06Q 20/3221* (2013.01); *G06Q 20/3229* (2013.01); *G06Q 20/3255* (2013.01); *G06Q 20/4014* (2013.01)

(58) Field of Classification Search
CPC ........... G06Q 20/1085; G06Q 20/3221; G06Q 20/3229; G06Q 20/3255; G06Q 20/4014
USPC ........................................................... 705/43
See application file for complete search history.

(56) References Cited

U.S. PATENT DOCUMENTS 10,445,711 B1 * 10/2019 Arumugam ........ G06Q 20/3274
10,467,604 B1 * 11/2019 Dorsch ................... G07F 19/20
11,983,695 B1 * 5/2024 Russell ................. H04L 63/083
2006/0200410 A1 * 9/2006 Kelley .................... G07F 19/20 235/379
2007/0203835 A1 * 8/2007 Cai ........................ G06Q 40/00 705/43
2009/0271287 A1 * 10/2009 Halpern ................ G06Q 40/00 705/26.1
2011/0022484 A1 * 1/2011 Smith .................... G06Q 20/12 705/17
2011/0213671 A1 * 9/2011 Hirson ................... G06Q 20/10 705/16
2013/0024360 A1 * 1/2013 Ballout .................. G06Q 20/40 705/39
(Continued)

*Primary Examiner* — Bennett M Sigmond
*Assistant Examiner* — Michael J Warden
(74) *Attorney, Agent, or Firm* — Plumsea Law Group, LLC

(57) ABSTRACT

A system and method for providing cash withdrawals (and other transactions) at ATMs for users of a mobile payment application are disclosed. The ATMs have integrated SIM cards associated with mobile directory numbers that can used to pass SMS messages to the ATMs. A user can request a cash withdrawal through a mobile payment application. The mobile payment application can automatically locate a nearby ATM and send a withdrawal request via an SMS message to a mobile directory number of the ATM, where the withdrawal request includes authorization information from the mobile payment application. The ATM confirms the withdrawal request with a remote server that stores related authorization information.

20 Claims, 6 Drawing Sheets

(56) References Cited

U.S. PATENT DOCUMENTS

| | | | |
|---|---|---|---|
| 2016/0180307 | A1 | 6/2016 | Laracey |
| 2018/0005206 | A1* | 1/2018 | Belin ................. G06Q 20/1085 |
| 2018/0130035 | A1* | 5/2018 | Dhulipalla ............. G06Q 20/40 |
| 2020/0382486 | A1 | 12/2020 | Dunjic et al. |
| 2025/0005992 | A1* | 1/2025 | Fumanelli ........ G06K 19/07327 |

* cited by examiner

ATMS FOR TRANSACTING WITH MOBILE APPLICATIONS

CROSS-REFERENCE TO RELATED APPLICATIONS

This application claims the benefit of Provisional Patent Application No. 63/325,767 filed Mar. 31, 2022, and titled "ATMs for Transacting with Mobile Applications," which is incorporated by reference herein in its entirety.

TECHNICAL FIELD

The present disclosure generally relates to automated teller machines, and in particular to methods of enabling transactions with automated teller machines.

BACKGROUND

Automated teller machines (ATMs) provide access points for banking customers to withdrawal cash (or check balances and make deposits) without having to travel to a particular bank retail location. When a banking customer wants to withdraw cash, he or she inserts their bank card into the ATM. The ATM then connects to an ATM network, which communicates with the relevant banking institutions to authorize the withdraw and transfer funds between accounts. To use an ATM, a customer must have a pre-authorized debit card from a member banking institution of the ATM network.

However, as more and more consumers switch from traditional banking institutions to using mobile payment applications that facilitate more direct user-to-user payments, many consumers lack or forgo carrying or using authorized debit cards. Moreover, funds held in an account managed by a mobile payment application may not be available for withdraw at an ATM, as those funds are not held directly by any member banking institutions. In addition, there is currently no infrastructure that would allow funds held by a party outside of a network of member banking institutions to be withdrawn from an ATM associated with that network.

There is a need in the art for a system and method that addresses the shortcomings discussed above.

SUMMARY

In one aspect, an automated teller machine for providing cash withdrawals to users of a mobile application running on a mobile device includes a processor and memory configured to store instructions that can be executed by the processor. The automated teller machine also includes a cellular networking module in communication with a cellular phone network, a SIM card, the SIM card storing a mobile identification number associated with an ATM mobile directory number, and an SMS module configured to send and receive SMS messages, over the cellular phone network, for the mobile directory number. The automated teller machine also includes a mobile withdrawal module, and a cash dispensing apparatus for dispensing cash from the automated teller machine. The mobile withdrawal module is configured to receive a withdrawal request, via a first SMS message sent from the mobile application, the SMS message being sent from a user mobile directory number, where the withdrawal request includes a withdrawal amount and authorization information, and send the authorization information to a remote server. Upon receiving a withdrawal request verification from the remote server in response to sending the authorization information, the mobile withdrawal module is further configured to send, via a second SMS message, a withdrawal request approval to the mobile application using the user mobile directory number and instruct the cash dispensing apparatus to dispense cash, according to the withdrawal amount.

In another aspect, a network of automated teller machines for providing cash withdrawals to users of a mobile application includes a first automated teller machine having a first SIM card, the first SIM card storing a first identification number associated with a first mobile directory number, and a second automated teller machine having a second SIM card, the second SIM card storing a second identification number associated with a second mobile directory number. The first automated teller machine can receive withdrawal requests from the mobile application via SMS messages sent to the first mobile directory number. The second automated teller machine can receive withdrawal requests from the mobile application via SMS messages sent to the second mobile directory number.

In another aspect, a method of dispensing cash using an automated teller machine, where the automated teller machine includes a SIM card storing an identification number associated with an ATM mobile directory number and an input device includes steps of receiving a first SMS message addressed to the ATM mobile directory number, the first SMS message being sent by a user mobile directory number, the SMS message including a withdrawal request for a withdrawal amount, and an authorization token and sending the authorization token to a remote server for verification. The method also includes steps of receiving a withdrawal request verification from the remote server, and sending a withdrawal request approval and a withdrawal code, via a second SMS message, to the user mobile directory number. Upon receiving the withdrawal code at the input device, the method further comprises dispensing cash according to the withdrawal amount.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DESCRIPTION OF EMBODIMENTS

Figure 1:
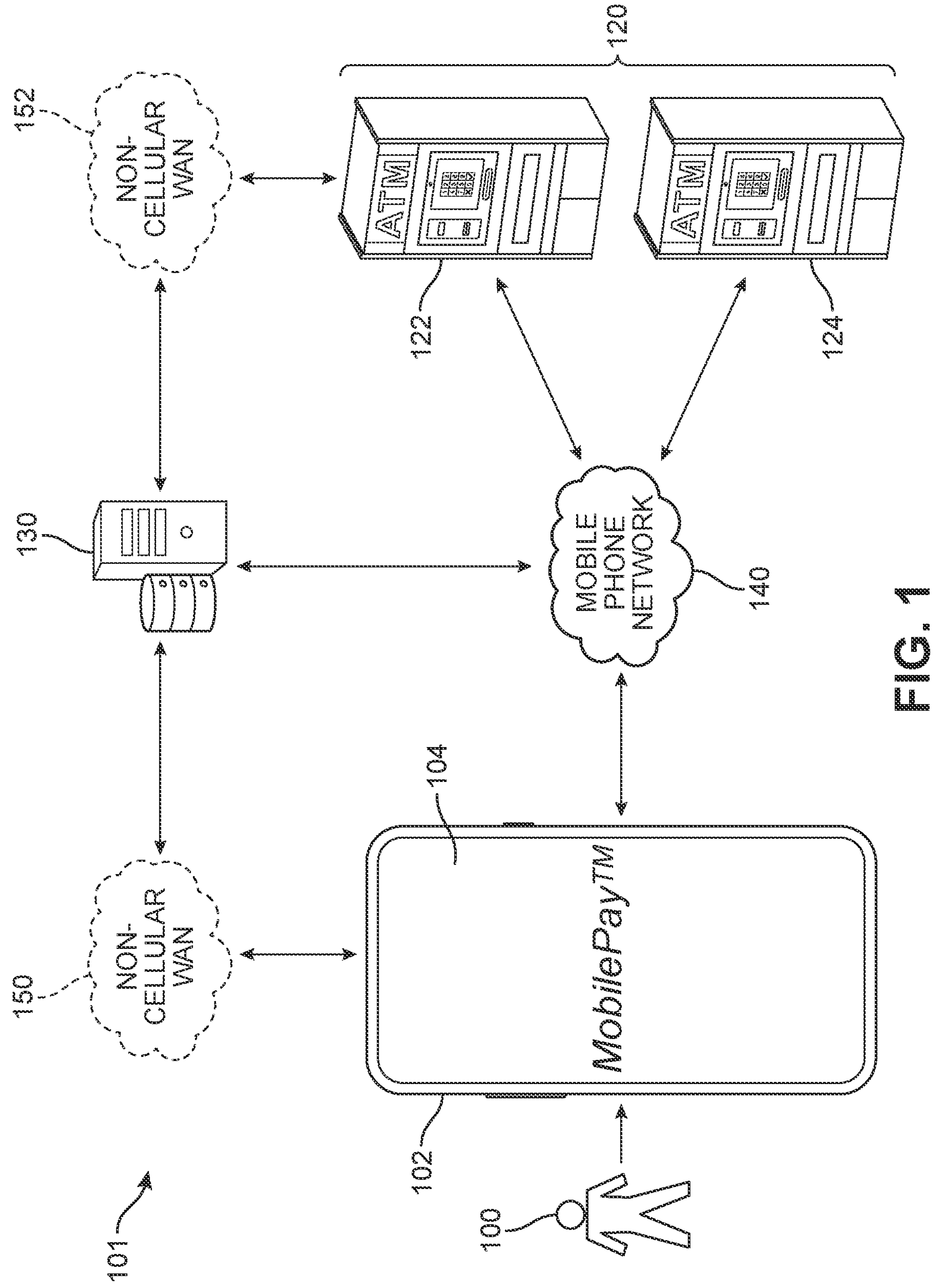
FIG. 1 is a schematic view of an architecture for facilitating transactions with one or more ATMs using a mobile application, according to an embodiment.

The embodiments provide systems and methods for providing cash withdrawals, deposits and other financial transactions at ATMs for users of a mobile payment application. Specifically, the systems and methods are configured to be used by consumers or other end users who do not have a debit card issued by a member banking institution associated with a particular ATM. The ATMs have integrated SIM cards associated with mobile directory numbers that can used to pass SMS messages to the ATMs. A user can request a cash withdrawal through a mobile payment application. The mobile payment application can automatically locate a nearby ATM and send a withdrawal request via an SMS message to a mobile directory number of the ATM, where the withdrawal request includes authorization information from the mobile payment application. The ATM confirms the withdrawal request with a remote server that stores related authorization information. The ATM can then reply to the user's mobile device with an SMS message indicating that the withdrawal request has been approved.

To enhance security, the ATM may be configured to provide a withdrawal code as part of the SMS message sent back to the user's mobile device. This code can be input into the ATM, by the user, upon arriving at the ATM, at which time the ATM can dispense cash to the user. Further security enhancements can include retrieving images of the user from a remote server, which may be indexed on the remote server by the user's mobile number. The retrieved image can be compared with a real-time image captured when the user arrives at the ATM.

In some embodiments, following an approval for withdrawal, but prior to the user arriving at the ATM, the system can monitor the cash balance of the ATM and reroute the withdrawal to another ATM anytime the cash balance is sufficiently low compared to the requested withdrawal amount. Rerouting can be done via SMS texts between ATMs in a network.

The embodiments help solve the technical problem of allowing users with mobile cash applications, which may not be tied to any ATM networks, to nevertheless withdrawal funds from ATMs. Moreover, the embodiments solve security problems related to receiving and approving withdrawal requests before a user has arrived at the ATM to receive the cash. Additionally, the embodiments enhance security by ensuring no personal information is transmitted from the mobile payment application to the ATM, aside from the user's mobile directory number. Withdrawal requests are managed via authorization tokens that can be checked by the ATM via backend communication with a remote server. The user's mobile directory number can be further used to index information stored on the remote server and associated to the user. With this configuration, the ATM does not need to know more than the user's mobile directory number to check that a withdrawal is authorized and/or to receive information for identity verification.

Various terms and definitions are gathered here for convenience.

An "automated teller machine", also referred to simply as an ATM, is an electronic machine that enables various financial transactions (such as withdrawals and deposits) with consumers. An "ATM network," also known as an "interbank network," is a computer network that enables consumers with authorized ATM cards (for example, debit cards issued by a participating institution) to withdraw and/or deposit funds at particular ATM machine.

As used herein, the term "digital payment service" refers to a payment service that enables online payments and/or user-to-user payments, for example, via the electronic transfer of funds between two user's bank accounts. In some cases, digital payment services may allow customers to hold funds in an account managed by the digital payment service, to facilitate quicker online and/or user-to-user payments.

A digital payment service may be integrated into an associated "digital payment application", which comprises a software application that can run on various devices such as cell phones, tablet computers, laptops, and/or desktop computers. As used herein, the term "mobile payment application," refers to a digital payment application running on a mobile computing device, such as a smart phone, smart watch, or other mobile computing device.

As used herein, the term "cellular network" refers to a communication network in which the links between nodes are wireless. The network comprises cells, where each cell includes at least one fixed-location transceiver. A "mobile phone network," refers to a cellular network that is used for making and receiving calls, and/or sending data, through the transceivers of the cellular network. In a mobile phone network, each cell cite is further connected to a telephone exchange that connects to the public telephone network.

The term "short message service," or simply "SMS," refers to a text messaging service that allows devices on a mobile phone network to exchange short text messages.

FIG. 1 is a schematic view of an architecture 101 that enables a consumer (also referred to as a "user") with an account on a mobile application to withdraw cash from an ATM, even when the user lacks a debit card issued by a member banking institution of the associated ATM network. Referring to FIG. 1, a user 100 operates a mobile device 102 (such as a smart phone) that runs a mobile payment application 212 ("MobilePay"). Mobile payment application 212 may allow user 100 to make various digital payments, including online payments, in-store digital payments, and direct user-to-user payments. As discussed in further detail below, mobile payment application 212 may also facilitate user 100 transacting with an ATM to withdraw cash and/or make deposits.

Architecture 101 also includes a plurality of ATMs 120 ("ATMs 120"). For purposes of illustration, only two ATMs are shown in this example (a first ATM 122 and a second ATM 124). However, it may be appreciated that the exemplary architecture may enable user 100 to withdraw cash and/or make deposits with any number of ATMs that are configured with the provisions discussed below.

Architecture 101 further includes a remote server 130. Remote server 130 may include provisions for processing and storing information. For example, remote server may comprise one or more servers for sending, receiving, processing, and storing data. Furthermore, remote server 130 may be configured with one or more databases that can be accessed by other components of architecture 101.

Components of architecture 101 may communicate using wireless networks. In particular, the embodiments may utilize at least a mobile phone network 140. As described in further detail below, for example, mobile device 102 may communicate with ATMs 120 using text messages sent over a mobile phone network 140.

In some embodiments, mobile device 102 and/or ATMs 120 may also communicate with remote server 130 using mobile phone network 140. Optionally, in some embodiments, mobile device 102 may communicate with remote server 130 using a non-cellular wide area network (WAN) 150. Likewise, in some embodiments, ATMs 120 may communicate with remote server 130 using a non-cellular wide area network (WAN) 152.

Figure 2A:
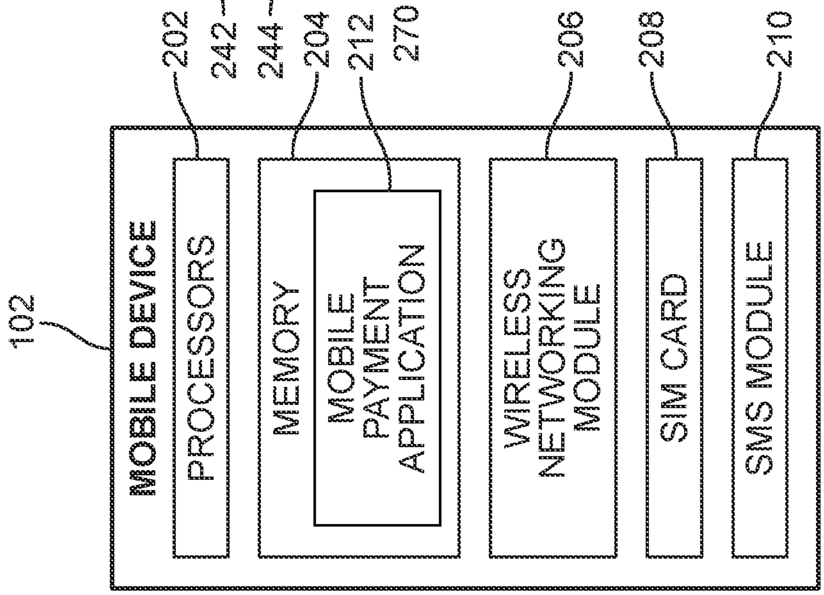
FIGS. 2A-C are schematic views of various components of an exemplary architecture for enabling transactions with ATMs, according to an embodiment.
Figure 2B:
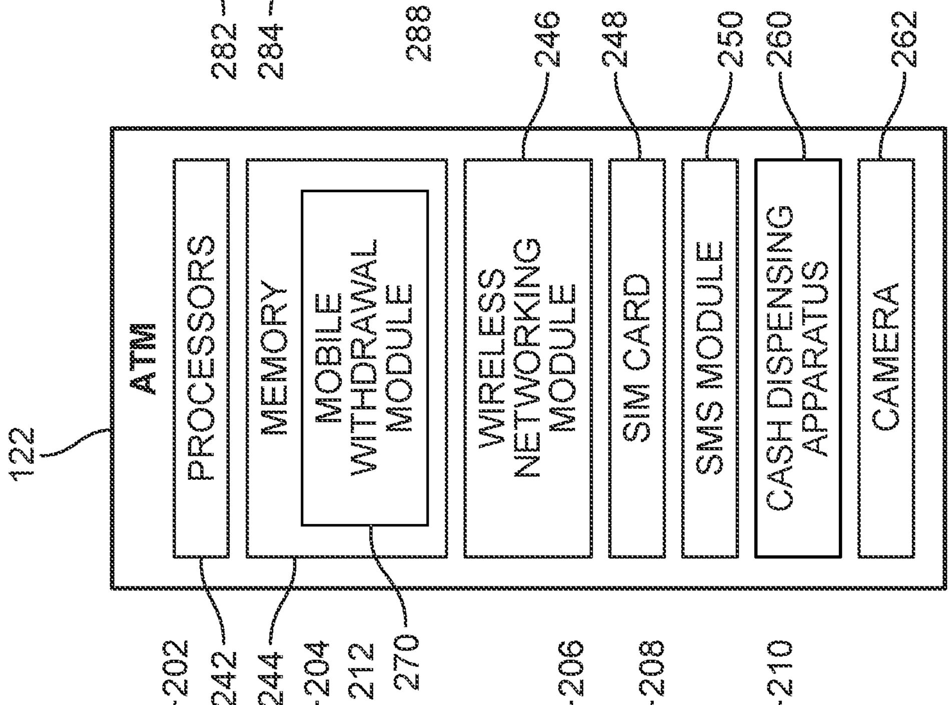
Figure 2C:
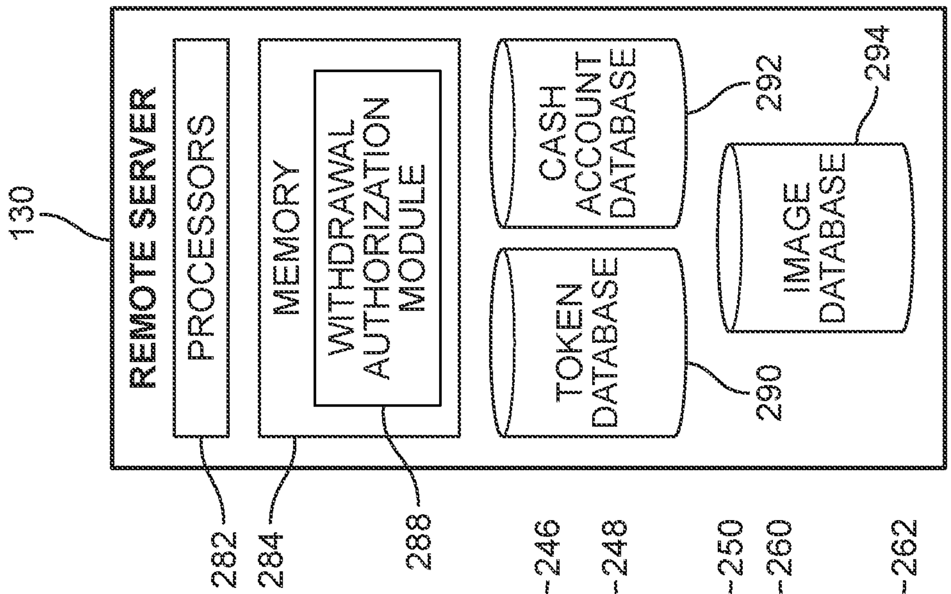

FIGS. 2A-C are schematic views of various components and modules associated with each of mobile device 102, first ATM 122 (or simply "ATM 122"), and remote server 130. It may be understood that a similar configuration may be used for second ATM 124, or any other ATM with similar components.

Referring to FIGS. 2A-C, each of these components may include processors and memory. The processors could be any suitable processors for the corresponding machine/device. The memory may be any suitable non-transitory medium that can store instructions that are executable by the processors. For example, mobile device 102 includes processors 202 and memory 204; ATM 122 includes processors 242 and memory 244; and remote server 130 includes processors 282 and memory 284.

Both mobile device 102 and ATM 122 may be further configured with components that facilitate communication over a mobile phone network. These include wireless networking modules, which may comprise both hardware and software components necessary for communication over a mobile network and/or other wireless networks. As an example, each of mobile device 102 and ATM 122 could include a cellular network card, a WiFi card, a Bluetooth radio, or any other suitable wireless networking card, chip, or radio. In the exemplary embodiment, mobile device 102 includes a wireless networking module 206 and ATM 122 includes a wireless networking module 246.

Each of mobile device 102 and ATM 122 may also include a subscriber identity module (SIM) card. A SIM card is an integrated circuit that can be used to store information identifying each user in a mobile telephone network. In some cases, the SIM card may store an international mobile subscriber identity (IMSI) number and an associated key. The IMSI and key are used to authenticate subscribers on a mobile telephone network. In some cases, a SIM card may also store data such as the short message service center (SMSC) number, which is used for sending and receiving SMS messages. In the exemplary embodiment, mobile device 102 includes a SIM card 208 and ATM 122 includes a SIM card 248. SIM card 208 stores an IMSI number and an associated mobile directory number that can be used to send/receive calls and texts to and from mobile device 202. SIM card 248 stores an IMSI number and an associated mobile directory number that can be used to send/receive calls and texts to and from ATM 122.

Components for facilitating SMS messages may also be integrated into each of mobile device 102 and ATM 122. For example, mobile device 102 can include an SMS module 210 and ATM 122 can include an SMS module 250.

Mobile device 102 may include a mobile payment application 212 stored in memory 204. Mobile payment application 212 (also referred to simply as "payment application 212"). Application 212 may be configured to run on mobile device 102. User 100 may have an account with a digital payment service that is accessible via mobile payment application 212. Using payment application 212, user 100 may make digital payments online and transfer funds with other users of the system. Additionally, payment application 212 may allow a user to withdraw cash from (or make deposits to) an ATM, as described in further detail below.

ATM 122 is further configured with a cash dispensing apparatus 260. Cash dispensing apparatus 260 may comprise a plurality of electronic and mechanical components used for receiving, storing, and dispensing cash from ATM 122.

In some embodiments, ATM 122 can include a camera 262. Camera 262 can be used to monitor activity at the ATM. In some cases, camera 262 may be used as part of an identity verification process, as described in further detail below.

ATM 122 may also include a mobile withdrawal module 270, which is stored in memory 244. Mobile withdrawal module 270 comprises software that can interface with a mobile payment application, as well as with a remote server. Mobile withdrawal module 270 may operate to receive, process, and facilitate the authorization of, withdrawal requests that are received from a mobile payment application. Additionally, once a request has been authorized, mobile withdrawal module 270 can provide instructions to cash dispensing apparatus 260 to dispense cash to an authorized user. Moreover, mobile withdrawal module 270 can implement security features to ensure that unauthorized users cannot gain access to cash intended for an authorized user.

Remote server 130 includes a withdrawal authorization module 288, stored in memory 284, that receives withdrawal authorization requests from ATM 122. Remote server 130 can also include a database 290 for storing authorization tokens, and/or related authorization information. Remote server 130 can also include a customer account database 292 that stores information, such as account balance information, for customers and users of mobile payment applications (such as application 212). In some embodiments, remote server 130 can also include a user image database 294. User image database 294 may store images of users of a mobile payment application, which can be used for identify verification.

Figure 3:
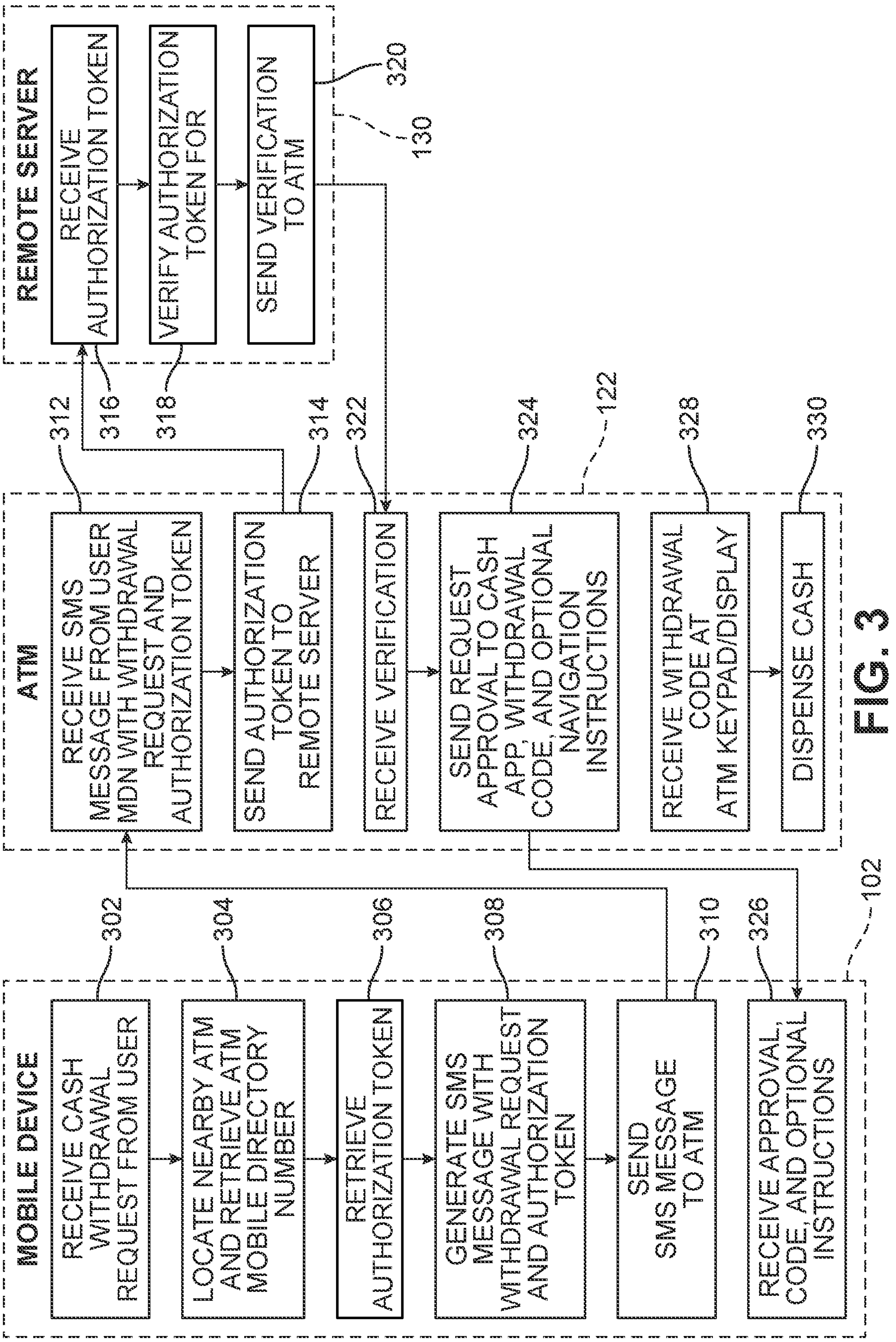
FIG. 3 is a schematic view of a process for enabling the withdrawal of funds from ATMs, according to an embodiment.

FIG. 3 is a schematic view intended to show how each of mobile device 102, ATM 122, and remote server 130 operate to facilitate cash withdrawals for users with a mobile payment application. It may be assumed in this case that the user does not have an ATM card. Moreover, the user may not have a banking account with a member bank that would allow the user to withdrawal cash from an ATM, using the conventional ATM network for processing and approving withdrawals for customers of member banks.

Instead, a user in this example has a mobile payment application that runs on a mobile device. The mobile payment application facilitates mobile, digital, and/or user-to-user payments. The user may have a mobile payment account used to make and receive payments. The mobile payment account could be associated to a bank account at a bank. However, the bank need not be a participating member in any ATM networks utilized by ATMs of the embodiments. Additionally, the mobile payment account can be used to hold funds separately from a user's own bank accounts.

Figure 4A:
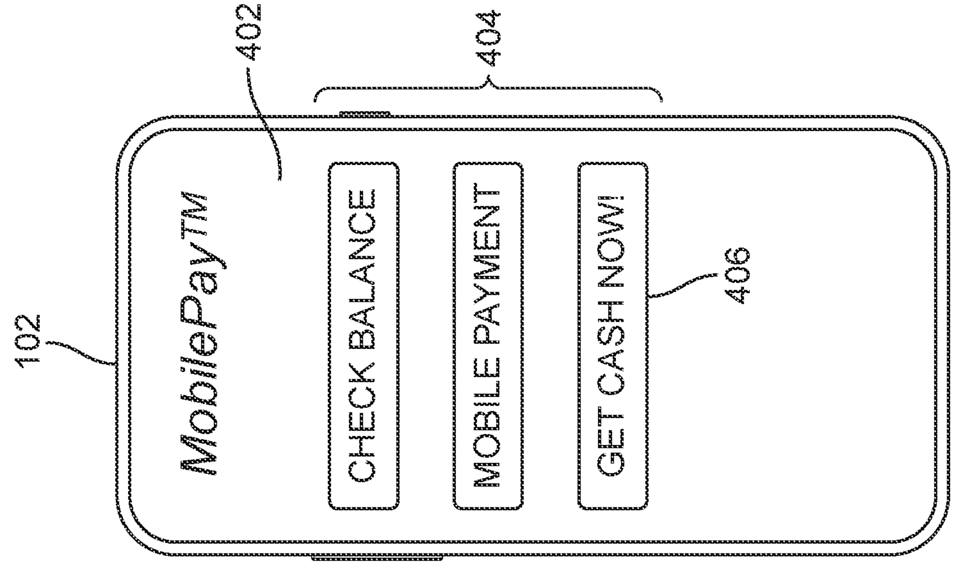
FIGS. 4A-C are schematic views of a user interface for withdrawing cash from an ATM using a mobile payment application, according to an embodiment.

In some embodiments, at least some of the steps performed by mobile device 102 may be performed by a mobile payment application, such as application 212, running on mobile device 102. Starting in step 302, application 212 may receive a cash withdrawal request from a user of mobile device 102. This request may be made through a user interface of application 212. For example, FIG. 4A shows a schematic view of a user interface 402 of application 212. User interface 402 provides a menu 404, from which a user can select a cash withdrawal option 406 ("Get Cash Now!").

Figure 4B:
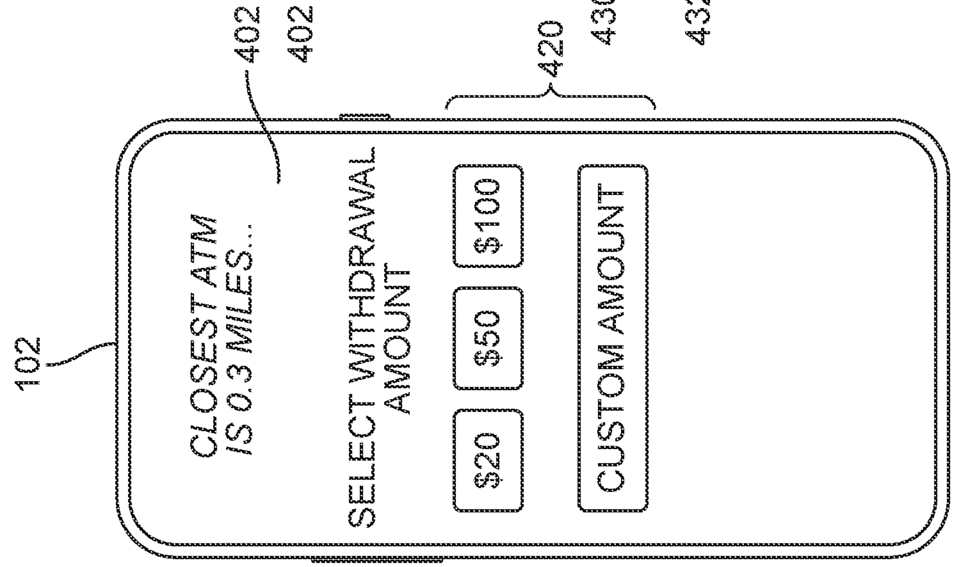

Once option 406 has been selected, a user could be presented with options for withdrawal amounts (including several pre-designated amounts and an option to customize the amount), which are shown as withdrawal options 420 in FIG. 4B.

In response to receiving this withdrawal request, application 212 may locate one or more nearby ATMs in step 304. In some cases, the ATMs can be located using a geographic information system (GIS), online mapping databases, and/or internally stored information about ATMs in a user's general area (city, county, or state, for example). In some cases, application 212 may retrieve a list of available ATMs, and then select a particular ATM according to suitable factors. Suitable factors could be shortest distance between the user and the ATM, shortest walking (or driving) time between the user and the ATM, or other suitable factors. In one embodiment, a system could automatically detect if a user is in a car or walking, and select an ATM depending on whether it is a walk-up or drive-up ATM.

As part of locating and selecting a nearby ATM, application 212 may also retrieve an ATM mobile directory number, also referred to as an MDN. This is a mobile telephone number linked to the international mobile subscriber identity stored on a SIM card of the ATM (such as SIM card 248 of ATM 122).

In step 306, application 212 can retrieve an authorization token. This authorization token can be retrieved from memory, generated using a known algorithm or process, or requested from a remote server. The authorization token provides information that can be checked by the ATM to confirm that a particular withdrawal is authorized. That is, application 212 can check, via communication with a remote server or another remote system, that a user has the requested funds in an account associated with the mobile payment application. This occurs prior to sending the withdrawal request to the ATM. Application 212 can then obtain the authorization token that provides evidence of authorization to the ATM.

Next, in step 308, application 212 can generate an SMS message with a withdrawal request and the authorization token. In some cases, the withdrawal request can include a withdrawal amount, as well as any information that may be used to look-up the authorization (such as information that identifies the mobile payment application, a user account, or any other suitable information). Specifically, in some cases, application 212 retrieves form data from an HTML form (or other Ul form) where the user has entered a withdrawal amount, and converts the form data to string data that can be inserted into the SMS message, along with the authorization token.

In step 310, application 212 may send the generated SMS message to ATM 122. More specifically, application 212 sends the generated SMS message to the mobile directory number for the selected ATM using a cellular network (such as network 140 in FIG. 1).

In step 312, ATM 122 receives the SMS message from the mobile directory number associated with the user/mobile device. Specifically, in some cases, mobile withdrawal module 270 may receive the SMS message with the withdrawal request and the authorization token.

In step 314, mobile withdrawal module 270 may send the authorization token to remote server 130 to verify the authorization.

In step 316, remote server 130 may receive the authorization token. In step 318, remote server 130 verifies that the authorization token is authentic. In some cases, verification can comprise checking the authorization token against information stored in a local database (such as token database 290). If the authorization token matches, or corresponds to, the stored information, remote server 130 can send a verification to ATM 122 in step 320.

Figure 4C:
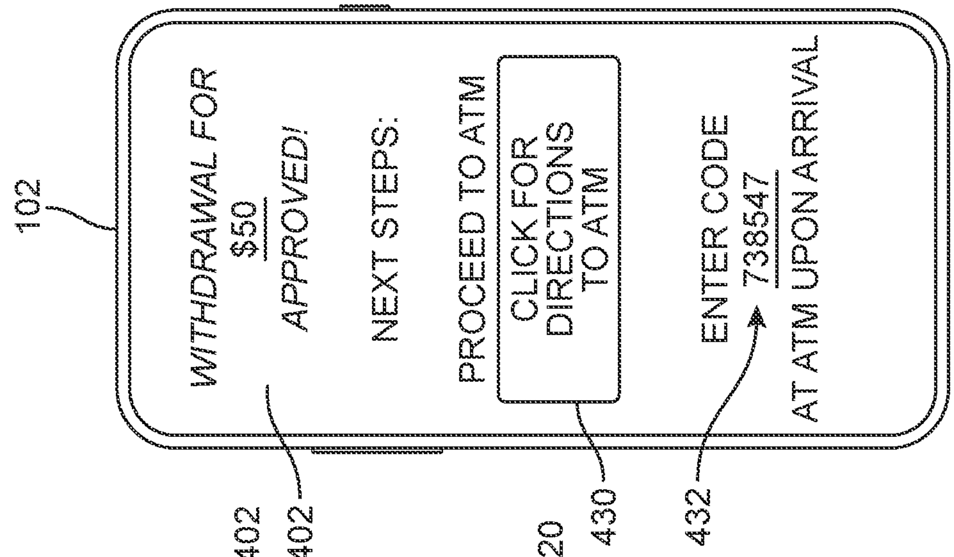

In step 322, mobile withdrawal module 270 receives the withdrawal request verification. Next, in step 324, mobile withdrawal module 270 sends an approval to the mobile payment application (application 212) running on mobile device 102. At this time, mobile withdrawal module 270 may also send a withdrawal code and/or navigation instructions from the user's current location to ATM 122. This information is then received at mobile device 102 in step 326. This information can be sent via an SMS message between ATM 122 and mobile device 102. In some cases, the SMS message could be displayed as simple text messages. In other cases, as shown in FIG. 4C, application 212 could extract the relevant information from the received SMS message and display the withdrawal approval along with optional directions 430 and withdrawal code 432.

The withdrawal code is a code that can be input into a keypad or touchscreen of the ATM. By requiring a user to enter the withdrawal code upon arriving at the ATM, this code helps prevent unauthorized users from trying to retrieve cash in the authorized amount from ATM 122 before the requesting user has arrived.

Once a user receives the SMS message in step 326, the user can travel to ATM 122. Upon arriving at ATM 122, the user can enter the withdrawal code into a keypad or touch-based display on ATM 122. This withdrawal code is then received by mobile withdrawal module 270 in step 328. Assuming the withdrawal code is correct, mobile withdrawal module 270 can instruct cash dispensing apparatus 260 of ATM 122 (see FIG. 2) to dispense cash to the user in the requested withdrawal amount.

Although this exemplary embodiment describes a process for withdrawing cash from an ATM using a mobile payment application, it may be appreciated that a similar process could be used to make deposits. In such cases, an ATM may be equipped with a deposit receiving apparatus to receive cash and/or checks. Moreover, a user would receive a deposit code from an ATM in response to a deposit request, and upon entering the deposit code, the user could deposit cash and/or a check.

Some embodiments can include enhanced security measures to ensure that unauthorized users are not able to access a user's funds. In one embodiment, a system could be configured to confirm the user's identify with photos at the ATM. This security provision could reduce the chances that an unauthorized user might be able to withdrawal funds even if they've obtained access to a user's device and the associated mobile payment application.

Figure 5:
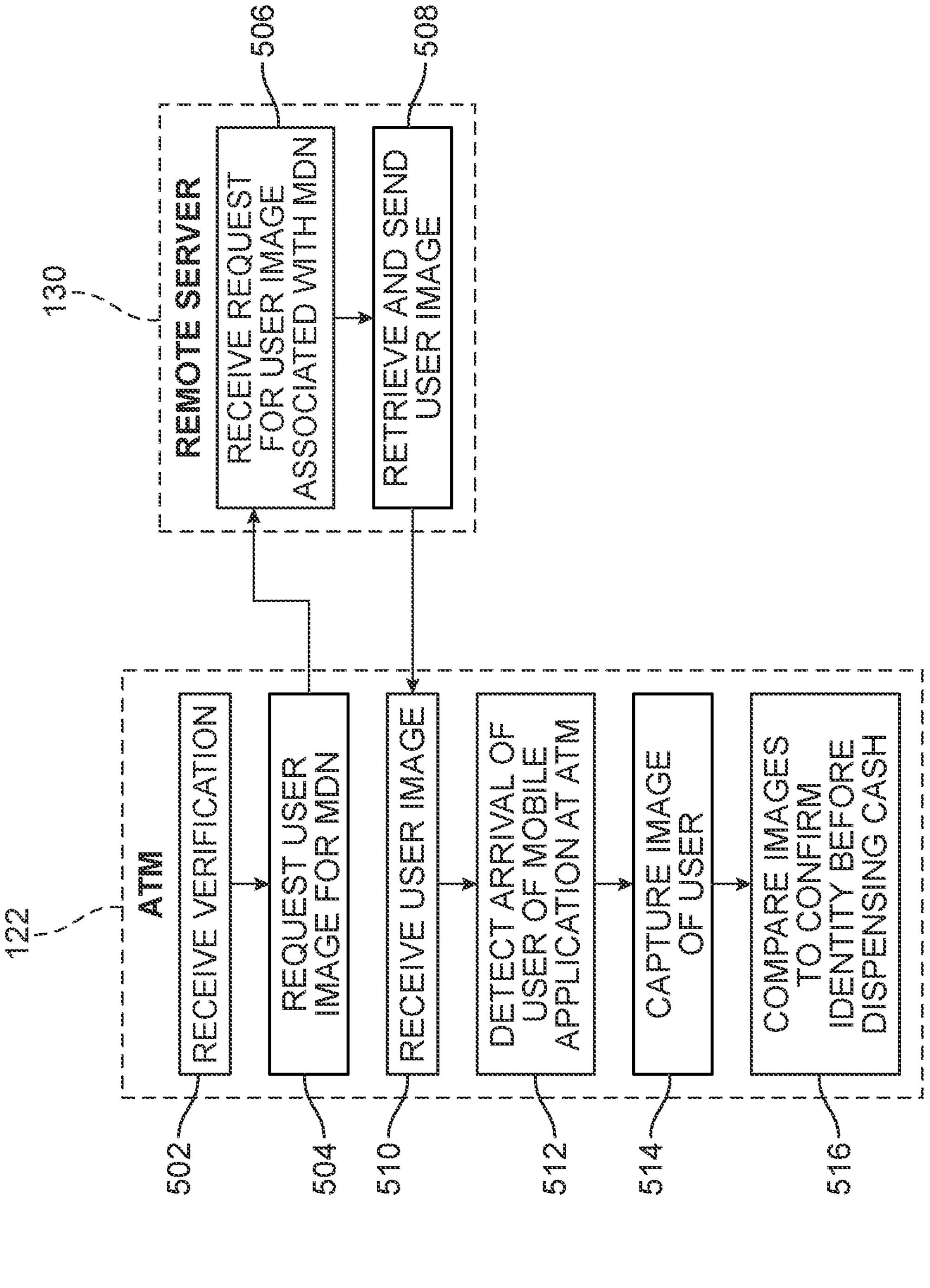
FIG. 5 is a schematic view of some steps in a process for dispensing cash, according to an embodiment.

FIG. 5 is a schematic view of an exemplary process for confirming a user's identity at an ATM before cash can be dispensed. It may be appreciated that the following process may comprise sub steps of the process of withdrawing cash from an ATM using a mobile payment application.

Starting in step 502, mobile withdrawal module 270 of ATM 122 receives a verification that the withdrawal request is authorized. In some cases, this verification may be received from a remote server (such as remote server 130). Next, in step 504, cash withdrawal apparatus 270 may request a user image (or photo) for the mobile directly number (MDN) associated to the user. In step 506, remote server 130 receives the request for the user image associated to the MDN. In step 508, remote server 130 retrieves and sends the user image associated with the MDN. In some cases, remote server 130 can look-up the user using the MDN.

In step 510, mobile withdrawal module 270 receives the user image, which may be sent and received via SMS. In step 512, mobile withdrawal module 270 may detect the arrival of a user of the mobile application at ATM 122. In some cases, detection occurs when the user enters the withdrawal code into the ATM. In other cases, the ATM may use one or more cameras (for example, camera 262) to detect the presence of a user at the ATM. Next, in step 512, mobile withdrawal module 270 may capture a live or real-time image of the user at ATM 122.

Then, in step 516, the captured image of the user at ATM 122 can be compared with the retrieved image of the user. This comparison can be achieved using suitable image matching algorithms. For example, in one embodiment, the images can be compared using keypoint matching algorithms. In keypoint matching algorithms, multiple points in each image are compared according to key features of the images. An exemplary keypoint matching algorithm may utilize a scale-invariant feature transform (SIFT) algorithm, which is a technique in computer vision for matching local features in images. If the images match (within some predetermined tolerance), the ATM can proceed to dispense cash. Otherwise, the withdrawal is cancelled.

The exemplary configuration provides a way to verify the user of the mobile device in a secure manner. Long term storage of images may only occur at the remote server. These images may be passed to the ATM for real-time image comparison, and images sent to, and captured by, the ATM for comparison can be deleted immediately after.

This configuration is useful because no personal information is transmitted between the mobile payment application and the ATM. Instead, only the withdrawal request and authorization token are sent from the mobile payment application to the ATM. The only link to the user may be the MDN, which the ATM can use to identify the user in requests to the remote server Conventional ATM systems dispense cash immediately upon approving a withdrawal request, as these systems require the user to be present at the ATM when requesting the withdrawal. If users are delayed in arriving at the ATM after making a request using a mobile payment application, there may be issues related to a lack of funds in the machine and/or issues with an open ended transaction occurring if a user never arrives at the ATM to receive their withdrawal.

Embodiments can include provisions to limit problems that may occur because of the delay that can occur between the time that a withdrawal is requested and the time that a user arrives at the ATM to retrieve the cash.

Figure 6:
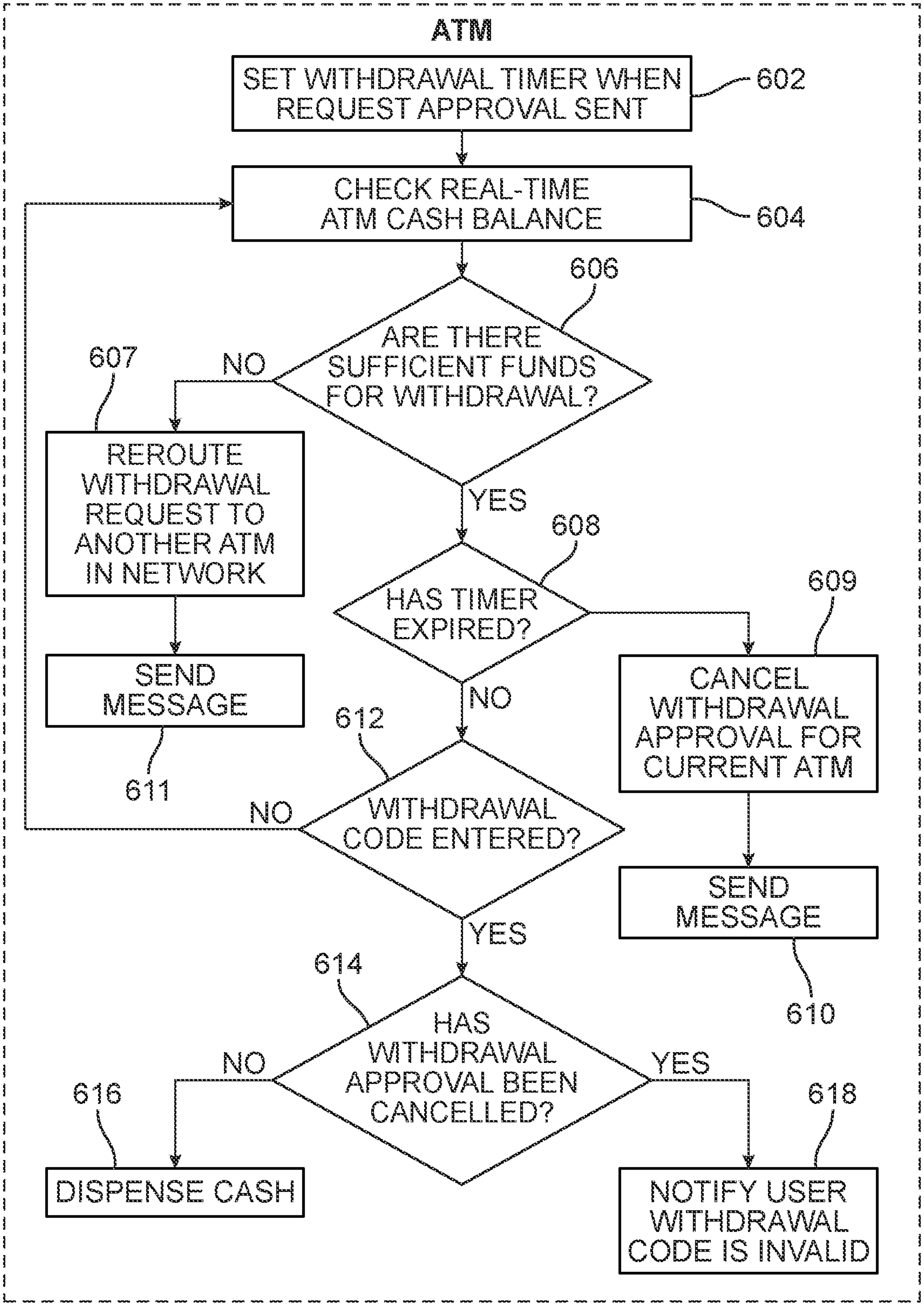
FIG. 6 is a schematic view of some steps in a process for dispensing cash, according to an embodiment.

FIG. 6 is a schematic view of some steps in a process for enabling cash withdrawals using a mobile payment application. These exemplary steps may be performed by a mobile withdrawal application after a withdrawal request has been approved. Starting in step 602, mobile withdrawal application 270 can set a withdrawal timer at the same time that the request approval is sent to the user's mobile device. In step 604, mobile withdrawal application 270 can check the real-time ATM cash balance. That is, mobile withdrawal application 270 can determine exactly how much cash is currently available for dispensing by the ATM. The embodiments can use any suitable methods for auditing the available cash, including various systems typically embedded within a cash dispensing apparatus, such as sensors that count bills as they are deposited and dispensed.

In step 606, mobile withdrawal application 270 determines if there are sufficient funds within the ATM to meet the recently approved withdrawal. It may be appreciated that this step may occur when the initial withdrawal request is received. However, in this exemplary process, this step also occurs after the withdrawal has been approved, but before any cash has been dispensed.

As used herein, the term "sufficient funds for withdrawal" may describe a relative percentage of the requested funds to the overall cash available in the ATM. As an example, in one embodiment, an ATM may have sufficient funds so long as the requested withdrawal amount is not more than 80% of the available cash in the ATM. Other suitable percentages could be used according to the preferences of the ATM owner, for example. Still other embodiments could use absolute withdrawal amounts and/or percentages of the total available cash.

If there are insufficient funds mobile withdrawal application 270 proceeds to step 607. This could occur, for example, because another customer has made a large withdrawal immediately after the withdrawal request from the mobile payment application has been approved, which has depleted the amount of cash available in the ATM.

At step 607, mobile withdrawal application 270 can reroute the withdrawal request to another ATM (such as ATM 122 in FIG. 1) In some cases, the rerouting can be done by sending an SMS message to another ATM that is in a similar geographic location (for example, within a predetermined distance to the known location of the user). The SMS message can be sent to a known MDN for the other ATM. In step 611, mobile withdrawal application 270 can send a message to the user's device indicating that the withdrawal request has been rerouted. The message can also include additional information such as the MDN and/or location of the ATM where the withdrawal request has been rerouted.

As an example, if ATM 122 has sent a withdrawal request approval to a user device and, subsequently, determined that there is not sufficient cash to fulfill the withdrawal request when the user arrives at ATM 122, then ATM 122 may reroute the request. For example, ATM 122 may determine that another ATM 124 (FIG. 1) is also located near a user. ATM 122 could send an SMS message to ATM 124 with a rerouting request. That is, ATM 122 could send an SMS message to a mobile directory number associated with ATM 124. This request could include the original withdrawal request, the withdrawal amount, and the withdrawal verification message from the remote server. ATM 124 could then confirm, via another SMS message, that the rerouting request has been approved, so that the user can proceed to ATM 124 to withdrawal funds. At that point, ATM 122 can send another SMS message to the user, alerting them to the change in ATM locations. In some cases, ATM 124 could also separately send a message to the user, providing a new withdrawal code and/or directions to ATM 124. Thus, using this configuration, the withdrawal can be rerouted from one ATM to another, without the need for each ATM to separately confirm the withdrawal authorization with the remote server.

If there are sufficient funds, as determined in step 606, mobile withdrawal application 270 may proceeds to step 608, to determine if the timer (which is set in step 602) has expired. If the timer has expired, mobile withdrawal application 270 may proceed to step 609 to cancel (or rescind) the withdrawal approval for the current ATM. Following this, in step 610, mobile withdrawal application 270 can send a message to a user's mobile device, for example using SMS, indicating that the withdrawal request has been canceled.

If the timer has not expired in step 608, mobile withdrawal application 270 may proceed to step 612 to check if the withdrawal code has been entered. If not, mobile withdrawal application 270 returns to step 604 to continue monitoring the real-time cash balance and the timer.

If the withdrawal code has been entered by a user present at the ATM, mobile withdrawal application 270 proceeds to step 614 to check if the withdrawal approval has been cancelled before dispensing cash in step 616. If the withdrawal code has been cancelled (for example, because the timer has expired or the request has been rerouted), mobile withdrawal application 270 proceeds instead to step 618 to notify the user that the withdrawal code is now invalid and that the withdrawal request has been cancelled.

It may be appreciated that in some embodiments, upon arriving at an ATM and entering a withdrawal code, the ATM may be configured to provide the requested amount of cash, automatically, without requiring the user to re-enter the requested amount into the ATM directly. That is, once the withdrawal request is received and verified, information about the withdrawal, such as the requested amount, can be saved locally in memory at the ATM and associated to the withdrawal code and/or other information that can identify the user at the ATM. Moreover, in embodiments where withdrawal requests may be rerouted from one ATM to another, as in the process described in FIG. 6, the requested amount of cash may be stored by the second (rerouted) ATM so that the user need only enter in the withdrawal code upon arriving at the ATM. The second/rerouted ATM can then retrieve the requested amount from memory, based on the withdrawal code and/or other information that can identify the user.

In some embodiments, the exemplary processes could me modified to include the use of an ATM card for providing additional authorization. For example, in cases where large amounts of cash are requested (such as $20,000), the exemplary system could be used to make the request on the user's mobile device and then find a nearby ATM that can dispense that amount. The system could provide directions to the selected ATM. Upon arrival, a user may be asked to insert his or her ATM card and enter the corresponding pin. This provides an additional layer of authentication/security for the relatively large transaction. Moreover, to prevent unauthorized users from exploiting this system, the system may be configured to only allow a user to withdrawal the originally requested cash amount (which was requested using the mobile device). Thus, a user would not be able to first request $20,000, and upon arriving at the ATM, change the request to $30,000.

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, e-book readers, laptop or desktop computers, all-in-one computers, as well as various kinds of digital media players.

The processes and methods of the embodiments can be stored as instructions and/or data on non-transitory computer-readable media. Examples of media that can be used for storage include erasable programmable read-only memory (EPROM), electrically erasable programmable read-only memories (EEPROM), solid state drives, magnetic disks or tapes, optical disks, CD ROM disks and DVD-ROM disks.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

For each of the exemplary processes described above including multiple steps, it may be understood that other embodiments some steps may be omitted and/or reordered. In some other embodiments, additional steps could also be possible.

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

The invention claimed is:

1. An automated teller machine (ATM) for providing cash withdrawals when an ATM card is presented along with an associated ATM pin code, the ATM also providing cash withdrawals to users of a mobile application running on a mobile device, the automated teller machine further comprising:

a processor and memory configured to store instructions that can be executed by the processor;

a cellular networking module in communication with a cellular phone network;

a SIM card, the SIM card storing a mobile identification number associated with an ATM mobile directory number;

an SMS module configured to send and receive SMS messages, over the cellular phone network, for the mobile directory number;

an input device;

a mobile withdrawal module;

a cash dispensing apparatus for dispensing cash from the automated teller machine;

wherein the mobile withdrawal module is configured to:

receive a withdrawal request, via a first SMS message sent from the mobile application, the SMS message being sent from a user mobile directory number, the withdrawal request including a withdrawal amount and authorization information indicating that the user has the requested funds in an account associated with the mobile application, the authorization information obtained from a remote server prior to sending the withdrawal request;

send the authorization information to the remote server;

wherein upon receiving a withdrawal request verification from the remote server in response to sending the authorization information, the mobile withdrawal module is further configured to:

send, via a second SMS message, a withdrawal request approval and a withdrawal code to the mobile application using the user mobile directory number, said withdrawal code being different than the ATM pin code, prompt a user of the mobile application to enter the withdrawal code into the input device; and instruct the cash dispensing apparatus to dispense cash, according to the withdrawal amount when said withdrawal code is entered into the input device to thereby allow the user to withdraw cash from the ATM without the use of an ATM card, and wherein, the withdrawal code is not an ATM pin code.

2. The automated teller machine according to claim 1, wherein the mobile withdrawal module is further configured to send, with the second SMS message, directions to the automated teller machine.

3. The automated teller machine according to claim 1, wherein the mobile withdrawal module is further configured to start a withdrawal timer when the second SMS message is sent, and wherein the mobile withdrawal module is configured to cancel the withdrawal approval when the timer expires.

4. The automated teller machine according to claim 1, wherein the remote server stores information for verifying the authorization information.

5. The automated teller machine according to claim 1, wherein the mobile withdrawal module is further configured to request a user image for the user mobile directory number from the remote server and to receive the requested user image from the remote server.

6. The automated teller machine according to claim 5, wherein the automated teller machine includes a camera, and wherein the withdrawal module is further configured to capture an image of the user of the mobile application and compare the captured image with the requested user image to confirm the identity of the user before dispensing cash.

7. The automated teller machine according to claim 1, wherein the mobile withdrawal module is further configured to monitor a real-time cash balance in the automated teller machine, and to cancel the withdrawal request approval when the withdrawal amount is greater than a predetermined percentage of the real-time cash balance.

8. The automated teller machine according to claim 7, wherein the mobile withdrawal module is further configured to retrieve a second mobile directory number associated with a second automated teller machine; and the mobile withdrawal module sends, via the SMS module, a third SMS message to the second mobile directory number, the third message including a withdrawal rerouting request, wherein the rerouting request further includes the withdrawal request, the withdrawal amount, and the withdrawal request verification.

9. The automated teller machine according to claim 8, wherein the mobile withdrawal module receives, via the SMS module, a fourth SMS message from the second mobile directory number, the fourth SMS message including a withdrawal rerouting approval; and wherein the mobile withdrawal module sends, via the SMS module, a fifth SMS message to the user mobile directory number including information about the second automated teller machine.

10. A method of dispensing cash using an automated teller machine (ATM) by use of a mobile application running on a mobile device, the automated teller machine including a SIM card storing an identification number associated with an ATM mobile directory number, and the ATM including an input device, the ATM also capable of dispensing cash when an ATM card is presented along with an associated ATM pin code, the method comprising the steps of:

receiving a first SMS message addressed to the ATM mobile directory number, the first SMS message being sent by a user mobile directory number of the mobile application, the SMS message including a withdrawal request for a withdrawal amount, and an authorization token indicating that the user has the requested funds in an account associated with the mobile application, the authorization token obtained from a remote server prior to sending the withdrawal request;

sending the authorization token to the remote server for verification;

receiving a withdrawal request verification from the remote server;

sending a withdrawal request approval and a withdrawal code, via a second SMS message, to the mobile application using the user mobile directory number, said withdrawal code being different than the ATM pin code;

prompting a user of the mobile application to enter the withdrawal code into the input device; and wherein upon receiving the withdrawal code at the input device, the method further comprises dispensing cash according to the withdrawal amount, said cash dispensed without requiring the use of an ATM card, and wherein, the withdrawal code is not an ATM pin code.

11. The method according to claim 10, further comprising requesting, from the remote server, a stored user image for the user mobile directory number.

12. The method according to claim 10, further comprising capturing a live image of a user located adjacent the automated teller machine, and comparing the captured live image with the stored user image to confirm the identity of the user before dispensing the cash.

13. The method according to claim 10, further comprising starting a timer when the second SMS message is sent, and invalidating the withdrawal code after the timer expires.

14. The method according to claim 10, further comprising monitoring a real-time cash balance in the automated teller machine, and canceling the withdrawal request approval when the withdrawal amount is greater than a predetermined percentage of the real-time cash balance.

15. The method according to claim 14, further comprising:

retrieving a second ATM mobile directory number associated with a second automated teller machine; and sending a third SMS message to the second ATM mobile directory number, the third message including a withdrawal rerouting request, wherein the rerouting request further includes the withdrawal request, the withdrawal amount, and the withdrawal request verification.

16. The method according to claim 15, further comprising:

receiving a fourth SMS message from the second ATM mobile directory number, the fourth SMS message including a withdrawal rerouting approval; and sending a fifth SMS message to the user mobile directory number including information about the second automated teller machine.

17. A mobile phone comprising:

a processor and memory:

a wireless networking module;

a SIM card, said SIM card storing an IMSI number and an associated mobile directory number that can be used to send and receive calls and texts to and from the mobile device;

an SMS module;

memory; and a mobile payment application stored on said memory and usable with an automated teller machine (ATM);

wherein, the automated teller machine includes: a processor and memory configured to store instructions that can be executed by the processor; a cellular networking module in communication with a cellular phone network; a SIM card, the SIM card storing a mobile identification number associated with an ATM mobile directory number; an SMS module configured to send and receive SMS messages, over the cellular phone network, for the mobile directory number; an input device; a mobile withdrawal module; and a cash dispensing apparatus for dispensing cash from the automated teller machine, the ATM capable of dispensing cash when an ATM card is presented along with an associated ATM pin code;

wherein, the mobile withdrawal module is configured to: receive a withdrawal request, via a first SMS message sent from the mobile payment application, the first SMS message being sent from a user mobile directory number, the withdrawal request including a withdrawal amount and authorization information indicating that the user has the requested funds in an account associated with the mobile payment application, the authorization information obtained prior to sending the withdrawal request; send the authorization information to a remote server; upon receiving a withdrawal request verification from the remote server in response to sending the authorization information send, via a second SMS message, a withdrawal request approval and a withdrawal code to the mobile payment application using the user mobile directory number, the withdrawal code being different than the ATM pin code prompt a user of the mobile payment application to enter the withdrawal code into the input device, and instruct the cash dispensing apparatus to dispense cash, according to the withdrawal amount when the withdrawal code is entered into the input device; and wherein, the mobile payment application is capable of causing the mobile phone to: send the first SMS message when the user requests funds in an account associated with the mobile payment application; receive the second SMS message indicating a withdrawal request approval and the withdrawal code; and display the withdrawal code on the mobile phone, said mobile payment application thereby allowing a user to access the account without the use of an ATM card and wherein the withdrawal code is not an ATM pin code, and wherein no personal information is transmitted from the mobile payment application to the ATM aside from the mobile directory number.

18. The mobile phone recited in claim 17, wherein, the user has an account with a digital payment service that is accessible via said mobile phone application.

19. The mobile phone recited in claim 17, wherein, said mobile phone application is cable of locating a nearby automated teller machine.

20. The mobile phone recited in claim 17, wherein, said mobile phone application provides a user interface on the mobile phone.

* * * * *